United States Patent
Kalhan et al.

(10) Patent No.: US 9,992,783 B2
(45) Date of Patent: Jun. 5, 2018

(54) HANDOVER OF DEVICE-TO-DEVICE (D2D) USER EQUIPMENT (UE) DEVICES USING D2D SUBFRAMES WITH CELL IDENTIFIERS

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days. days.

(21) Appl. No.: 15/105,536

(22) PCT Filed: Dec. 18, 2014

(86) PCT No.: PCT/US2014/071260
§ 371 (c)(1),
(2) Date: Jun. 16, 2016

(87) PCT Pub. No.: WO2015/095583
PCT Pub. Date: Jun. 25, 2015

(65) Prior Publication Data
US 2016/0330781 A1 Nov. 10, 2016

Related U.S. Application Data

(60) Provisional application No. 61/919,284, filed on Dec. 20, 2013.

(51) Int. Cl.
*H04W 4/00* (2018.01)
*H04W 72/10* (2009.01)
(Continued)

(52) U.S. Cl.
CPC ........... *H04W 72/10* (2013.01); *H04L 67/104* (2013.01); *H04W 4/005* (2013.01); *H04W 4/08* (2013.01);
(Continued)

(58) Field of Classification Search
CPC ....... H04W 72/10; H04W 4/005; H04W 4/08; H04W 36/36; H04W 24/08; H04W 36/30;
(Continued)

(56) References Cited

U.S. PATENT DOCUMENTS

2012/0093098 A1  4/2012 Charbit et al.
2012/0243431 A1  9/2012 Chen et al.
(Continued)

FOREIGN PATENT DOCUMENTS

KR  1020110103852 A  9/2011
KR  1020120074247 A  7/2012
(Continued)

OTHER PUBLICATIONS

Kyocera; "Inter-frequency and inter-PLMN D2D discovery"; R2-144534; 3GPP TSG RAN WG2 #87bis; Oct. 6-10, 2014; Shanghai, CN.
(Continued)

*Primary Examiner* — Clemence Han (57) ABSTRACT

A Device-to-device (D2D) user equipment (UE) device communicating with another D2D UE device within a first cell transmits a D2D subframe that includes a cell identifier a second cell when the UE device moves from the first cell to the second cell. After a handover to the second cell is initiated, the D2D UE device can suspend D2D communication. The D2D UE device transmits the D2D subframe, such as D2D discovery subframe, identifying the second cell when the handover is complete. The other D2D UE device identifies the second cell to the base station providing the first cell. The base stations providing the first cell and the second cell coordinate to determine resources for D2D communication between the D2D UE devices.

22 Claims, 6 Drawing Sheets

(51) Int. Cl.
*H04W 72/12* (2009.01)
*H04W 56/00* (2009.01)
*H04W 76/02* (2009.01)
*H04W 36/00* (2009.01)
*H04W 48/14* (2009.01)
*H04W 72/04* (2009.01)
*H04W 24/08* (2009.01)
*H04W 36/30* (2009.01)
*H04W 36/36* (2009.01)
*H04W 4/08* (2009.01)
*H04L 29/08* (2006.01)
*H04W 88/02* (2009.01)
*H04W 88/08* (2009.01)

(52) U.S. Cl.
CPC ....... *H04W 24/08* (2013.01); *H04W 36/0022* (2013.01); *H04W 36/0061* (2013.01); *H04W 36/30* (2013.01); *H04W 36/36* (2013.01); *H04W 48/14* (2013.01); *H04W 56/001* (2013.01); *H04W 56/0015* (2013.01); *H04W 72/048* (2013.01); *H04W 72/0413* (2013.01); *H04W 72/0453* (2013.01); *H04W 72/1278* (2013.01); *H04W 76/023* (2013.01); *H04W 72/1215* (2013.01); *H04W 88/02* (2013.01); *H04W 88/08* (2013.01)

(58) Field of Classification Search
CPC ......... H04W 72/0453; H04W 36/0061; H04W 36/0022; H04W 48/14; H04W 72/0413; H04W 72/048; H04W 56/001; H04L 67/104

See application file for complete search history.

(56) References Cited

U.S. PATENT DOCUMENTS

| | | |
|---|---|---|
| 2012/0322484 A1 | 12/2012 | Yu et al. |
| 2013/0005377 A1 | 1/2013 | Wang et al. |
| 2013/0102314 A1* | 4/2013 | Koskela ............ H04W 36/0072 455/436 |
| 2013/0150061 A1 | 6/2013 | Shin et al. |
| 2013/0324114 A1 | 12/2013 | Raghothaman et al. |
| 2014/0315562 A1 | 10/2014 | Lim et al. |
| 2015/0146687 A1* | 5/2015 | Kim ................... H04W 76/023 370/331 |

FOREIGN PATENT DOCUMENTS

| | | |
|---|---|---|
| KR | 1020130065357 A | 6/2013 |
| WO | WO 2011-109027 A1 | 9/2010 |
| WO | WO 2013-036068 A1 | 3/2013 |
| WO | WO 2013-040070 A1 | 3/2013 |
| WO | WO 2013-062351 A1 | 5/2013 |
| WO | WO 2013-098461 A1 | 7/2013 |
| WO | WO 2013-102390 A1 | 7/2013 |
| WO | WO 2013-113371 A1 | 8/2013 |
| WO | WO 2013-162345 A1 | 10/2013 |
| WO | WO 2013-177447 A1 | 11/2013 |

OTHER PUBLICATIONS

ZTE; "Inter-cell discovery relevant signalling"; R2-143604; 3GPP TSG RAN WG2 Meeting #87; Aug. 19-22, 2014; Dresden, DE.
LG Electronics; "D2D radio resource usage upon mobility"; R2-134372; 3GPP TSG RAN WG2 #84; Nov. 11-15, 2013; San Francisco, US.
ZTE; "Resource Allocation of D2D Communication"; R1-134308; 3GPP TSG-RAN WG1, Meeting #74bis; Oct. 7-11, 2013; Guangzhou, China.

* cited by examiner

HANDOVER OF DEVICE-TO-DEVICE (D2D) USER EQUIPMENT (UE) DEVICES USING D2D SUBFRAMES WITH CELL IDENTIFIERS

PRIORITY CLAIM

The present application claims priority to Provisional Application No. 61/919,284 entitled "Scheduling for D2D Communications," filed Dec. 20, 2013, assigned to the assignee hereof and hereby expressly incorporated by reference in its entirety.

FIELD

This invention generally relates to wireless communications and more particularly to management of device-to-device (D2D) discovery signals.

BACKGROUND

Many wireless communication systems use base stations (communication stations, transceiver stations, eNodeBs, eNBs) to provide geographical service areas where wireless communication user equipment devices (UE devices) communicate with the base station providing the particular geographical service area in which the UE devices are located. The base stations are connected within a network allowing communication links to be made between the UE devices and other devices. The communication system may include base stations that provide overlapping service areas of different sizes to serve various needs of mobile UE devices. For example, macrocell communications stations may provide macrocell service areas that are larger and may cover one or more small cell service areas provided by small cell base stations.

In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. The communication resources (e.g., time frequency blocks) used for D2D communication are typically a subset of the communication resources used by the communication system for communication between UE devices and the base stations.

An in-coverage (InC) UE device is a UE device that is within the service area of a base station and is capable of communication with the base station. An out-of-coverage (OoC) UE device is a UE device that is not within a service area of any base station. D2D UE devices that are engaged in D2D communication with each other form a group. A D2D group, therefore, includes two or more D2D UE devices. There are five typical coverage scenarios that occur with D2D groups. In a first coverage scenario, all the UE devices of the D2D group are located in a service area of a single base station. For the first scenario, therefore, all of the D2D UE devices of the D2D group are InC UE devices in a single service area. In a second coverage scenario, none of the UE devices of the D2D group are located inside any service area of any base station. For the second scenario, therefore, all of the D2D UE devices of the D2D group are OoC UE devices. In a third coverage scenario, at least one of the UE devices of the D2D group is located in a service area of a single base station and at least one D2D UE device of the group is outside all service areas. For the third scenario, therefore, at least one of the D2D UE devices of the D2D group is InC UE device in a single service area and at least one UE device is an OoC UE device. The third coverage scenario is sometimes referred to as a partial coverage scenario. In a fourth coverage scenario, at least one of the UE devices of the D2D group is located within a first service area of a first base station and at least one D2D UE device of the group located within a second service area of a second base station. For the fourth scenario, therefore, at least two of the D2D UE devices of the D2D group are InC UE devices in different service areas. In a fifth coverage scenario, at least one of the UE devices of the D2D group is located within a first service area of a first base station, at least one D2D UE device of the group located within a second service area of a second base station, and at least one UE device of the D2D group is an OoC UE device. For the fifth scenario, therefore, at least two of the D2D UE devices of the D2D group are InC UE devices in different service areas and at least one D2D UE device of the group is an OoC UE device. Other coverage scenarios are possible. For the fourth and fifth coverage scenarios at least one UE device is served by one base station and at least one UE device is served by another base station. Such scenarios are typically referred to as an inter-cell coverage scenario. Since the UE devices of a group are mobile, there are situations where the coverage scenario of a D2D group changes. For example, a UE device of a D2D group may move from a first service area served by a first base station to a second service area served by a second base station.

SUMMARY

A Device-to-device (D2D) user equipment (UE) device communicating with another D2D UE device within a first cell transmits a D2D subframe that includes a cell identifier a second cell when the UE device moves from the first cell to the second cell. After a handover to the second cell is initiated, the D2D UE device can suspend D2D communication. The D2D UE device transmits the D2D subframe, such as D2D discovery subframe, identifying the second cell when the handover is complete. The other D2D UE device identifies the second cell to the base station providing the first cell. The base stations providing the first cell and the second cell coordinate to determine resources for D2D communication between the D2D UE devices.

DETAILED DESCRIPTION

A communication specification defines macrocell communication resources for communication between base stations (communication stations, eNBs, etc.) and wireless communication user equipment (UE) devices. The macrocell communication resources include defined downlink communication resources and defined uplink communication resources, both defined by the communication specification. Downlink communication resources selected from the defined downlink communication resources that are assigned (scheduled) for downlink communication are referred to as scheduled downlink communication resources. Uplink communication resources selected from the defined uplink communication resources that are assigned (scheduled) for uplink communication are referred to as scheduled uplink communication resources. In accordance with embodiments of the invention, some macrocell communication resources are reserved for device-to-device (D2D) communication. These reserved resources are referred to as reserved D2D communication resources. Although defined downlink communication resources and/or defined uplink communication resources can be used for D2D communication, only defined uplink resources are used for D2D communication in the examples herein. A portion of the reserved D2D communication resources is reserved for out-of-coverage (OoC) D2D communication and another portion is reserved for in-coverage (InC) D2D communication. The portion of D2D communication resources reserved for out-of-coverage (OoC) D2D communication is referred to herein as OoC D2D reserved communication resources and the portion reserved for in-coverage (InC) D2D communication is referred to herein as InC D2D reserved communication resources. For the example, all reserved D2D communication resources that are not reserved for OoC D2D communication are reserved for InC D2D communication. As discussed below in further detail, different sets of InC D2D reserved communication resources are assigned to different D2D groups. Communication resource allocation information indicating the resource assignment is broadcast to all of the D2D UE devices within the service area of the base station in some circumstances. In other circumstances, communication resource allocation information is transmitted to at least one of the D2D UE devices of the D2D group. The InC D2D communication resources may be assigned to the D2D groups based on a priority level of the group. The priority levels of the D2D groups can be obtained from the network and/or relayed to the base station by one or more D2D UE devices. In some circumstances, a D2D group may be in a inter-cell coverage scenario where the D2D group includes at least one D2D UE device in one cell and at least one other D2D UE device in another cell. For the examples herein, D2D communication resources for such scenarios are managed by the base stations to identify acceptable D2D communication resources for the D2D communication between the D2D UE devices in inter-cell D2D group. As discussed below, a D2D UE device requesting D2D communication resources for D2D communication with other D2D UE devices served by other cells indicates, to the base station serving the requesting D2D UE device, the cell identifiers of the cells serving the other D2D devices that will receive D2D transmissions from the requesting UE device. The requesting D2D UE device determines the cell identifiers of the other cells from D2D subframes transmitted by the other D2D UE devices. The D2D subframes, therefore, convey the cell identifier of the serving cell of the device transmitting the D2D subframe. In some circumstances, the D2D subframes may be D2D discovery subframes. Therefore, the cell identifiers may be transmitted in D2D discovery signals.

Figure 1:
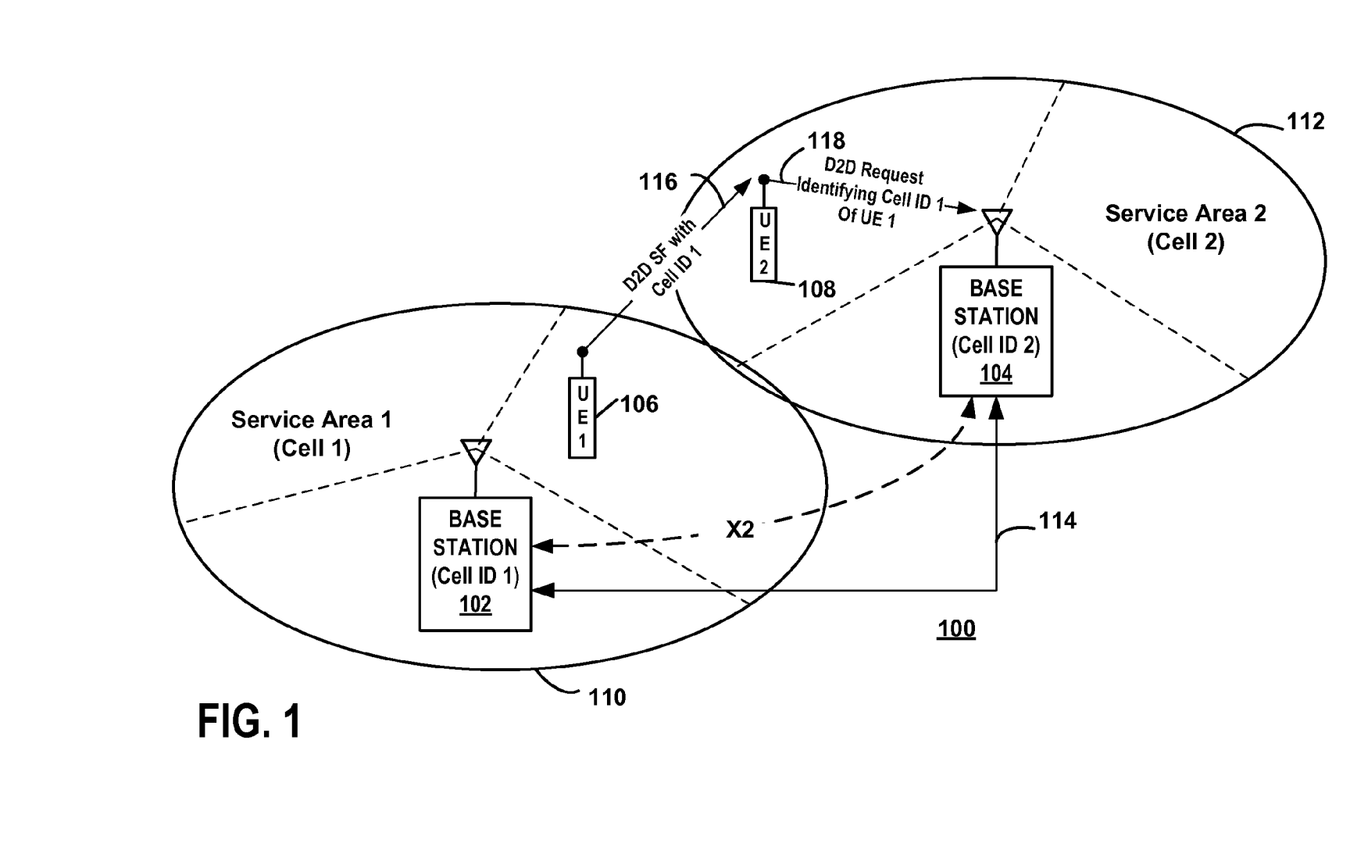
FIG. 1 is a block diagram of a communication system where macrocell communication resources are used for device-to device (D2D) communication and user equipment (UE) devices transmit D2D subframes that identify a serving cell.

FIG. 1 is a block diagram of a communication system 100 where macrocell communication resources are used for device-to device (D2D) communication. Base station 102, 104 provide wireless communication services to wireless communication UE devices 106, 108 within geographical service areas 110, 112, sometimes referred to as cells. Several base stations are typically interconnected through a backhaul 114 to provide several service areas to cover large areas. In some situations, a base station may provide more than one cell. For example, a base station may include a single base station controller connected to multiple radio heads to provide more than one cell. In the interest of brevity and clarity, the example of FIG. 1, each base station provides a single cell. The techniques discussed herein may be applied to other cellular arrangements. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

Each of the base stations 102, 104 is a fixed transceiver station, sometimes referred to as an eNodeB or eNB, which may include a controller in some circumstances. Each base station may be connected to a network controller (not shown) within a cellular network through the backhaul 114 which may include any combination of wired, optical, and/or wireless communication channels. For the examples herein, the controller includes the functionality of the Mobility Management Entity (MME) and the Packet Gateway (P-GW). Accordingly, the controller typically includes a scheduler which may schedule resources for communication between the base stations and UE devices and, in some situations, between UE devices for D2D communication.

The wireless (UE) communication devices 106, 108 (collectively UE devices) may be referred to as mobile devices, wireless devices, wireless communication devices, and mobile wireless devices, UEs, UE devices as well as by other terms. The UE devices include electronics and code for communicating with base stations and with other UE devices in device-to-device configurations. The UE devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device. For example, a UE device may include a wireless modem connected to an appliance, computer, television, or other device.

As explained above, in some situations, two or more UE devices may communicate directly with each other without communication through a base station. Such device-to-device (D2D) communication may occur between UE devices within the service area of a base station, outside the service area, or within multiple service areas. In FIG. 1, the first D2D UE device (UE1) 106 is within the first service area (Cell 1) 110 and the second D2D UE device (UE2) 108 is within the second service area (Cell 2) 112. In the example, the D2D UE devices 106, 108 establish D2D communication using D2D communication resources assigned, or at least allocated, by the base stations 102, 104.

The base station 102 includes a wireless transceiver (transmitter and receiver) that can exchange wireless signals with the UE devices within the service area 110 such as the first D2D UE device 102. The second base station 104 also includes a wireless transceiver (transmitter and receiver) that can exchange wireless signals with UE devices within the other service area (Cell 2) 112 such as the second D2D UE device 108. Transmissions from the base stations and from the UE devices 106, 108 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

A substantial portion of the macrocell communication resources are used for transmitting the downlink signals and the uplink signals. Each of the base stations transmits downlink signals to the UE devices in its respects service area (cell) using scheduled downlink communication resources of the defined downlink communication resources defined by the communication specification and reserved for downlink communication. The UE devices transmit uplink signals to the base stations 102, 104 using scheduled uplink communication resources of the defined uplink communication resources defined by the communication specification and reserved for uplink communication. The macrocell communication resources include frequency bands divided in time where each frequency band and segment of time can be identified by the scheduler and described in control signals sent from the base stations 102, 104 to the UE devices. The communication specifications, or other system rules, therefore, define applicable communication resources for the downlink and applicable communication resources for the uplink. The scheduler allocates different time-frequency resources to different devices to efficiently utilize the resources while minimizing interference. Accordingly, the scheduled macrocell communication resources used for signals exchanged with one UE device are different from scheduled macrocell communication resources used for other signals exchanged with other UE devices. As referred to herein, therefore, the defined macrocell communication resources are the communication resources reserved for communication by the specification and/or communication system rules. The scheduled resources for macrocell transmission for particular signals, however, are a subset of the reserved macrocell communication resources and are typically dynamically changed during operation.

For the examples herein, each D2D UE device transmits D2D subframes that identify the serving cell of the D2D UE device. Therefore, for the example in FIG. 1, the first UE device 106 transmits D2D subframes 116 that include a cell identifier that identifies the first cell 110. Although not shown in FIG. 1, the second UE device (UE2) 108 also transmits a discovery signal identifying the second cell 112. A suitable technique for transmitting the D2D subframe includes transmitting the D2D subframe in accordance with the Rel-8 PUSCH structure except the last symbol in the D2D UL subframe is left blank. Is some situations the D2D subframe may be a D2D discovery subframe. The discovery signals are transmitted in the resources assigned as a subset of discovery signal resource pool set.

As discussed below, the cell identifier may be conveyed by including a Cell ID within the D2D subframe. The Cell ID is a unique (or at least geographically unique) identifier of a cell. For one example, the Cell ID is contained in the D2D subframe message. In another example, the scrambling embedded in the demodulation reference signal (DMRS) used for demodulating the D2D subframe is manipulated to reflect the Cell ID. For example, the reference signal (RS) of a discovery signal can be scrambled using the Cell ID such that the other UE devices can determine the Cell ID when descrambling the RS of the D2D subframes such as discovery signals.

If the second D2D UE device 108 determines that a D2D communication link should be established with the first D2D UE device 106, the second D2D UE device 108 transmits a D2D request 118 to its serving base station where the D2D request identifies the serving cell of the first UE device. The D2D request 118 is a request for D2D communication resources. The serving cell of the first UE device 106 may be conveyed in the request 118 by including the Cell ID of the serving cell 110 of the first UE device 106. For the examples herein, the D2D request 118 also includes information identifying the first UE device 106. In response to receiving the D2D request 118, the second base station 104 communicates and coordinates with the first base station 102 to establish the D2D resources that will be assigned for D2D communication between the first UE device and the second UE device. The base stations communicate over the backhaul 114 using X2 messaging. For the examples herein, the first UE device 106 also sends a D2D request message to its serving base station (the first base station 102) wherein the request identifies the serving cell of the second UE device 108. Accordingly, the first UE device sends a D2D request to the first base station 102 including Cell ID 2. Although various techniques may be used to establish the D2D communication resources, an example of suitable technique includes a procedure where the base stations bid for D2D resources.

Figure 2A:
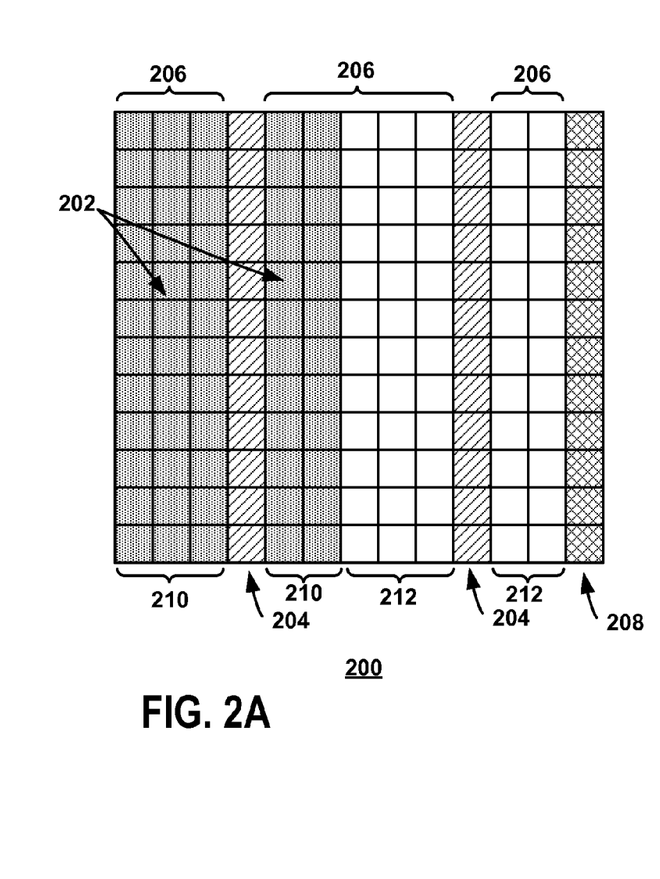
FIG. 2A is a block diagram of a D2D subframe that identifies the serving cell of the UE device transmitting the D2D subframe where the cell identifier is sent in the D2D message.
Figure 2B:
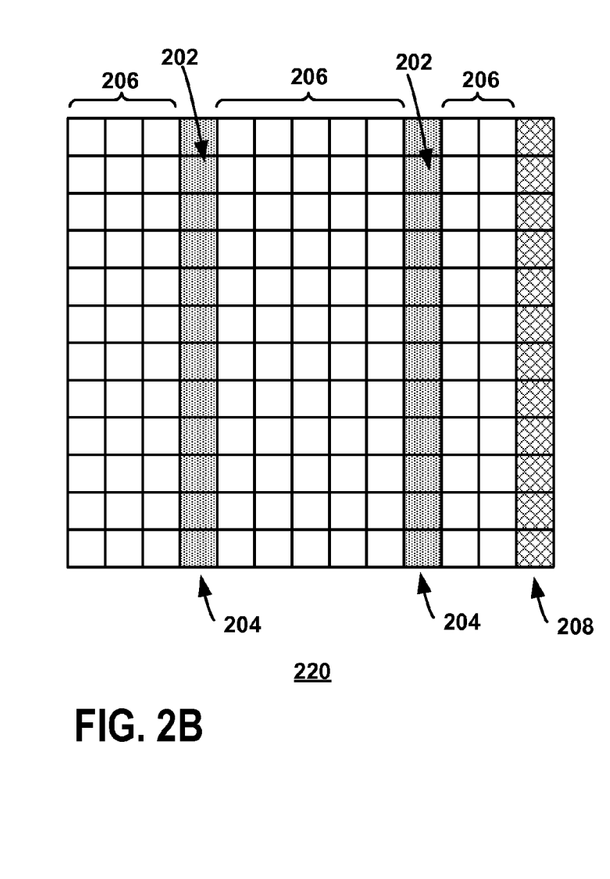
FIG. 2B is a block diagram of a D2D subframe that identifies the serving cell of the UE device transmitting the D2D subframe where the cell identifier is embedded in the reference signal.

FIG. 2A and FIG. 2B are block diagram of D2D subframes 200, 220 that identify the serving cell of the UE device transmitting the D2D subframe. For the example, each subframe 200, 220, conveys a cell identifier 202. Accordingly, the D2D subframes 200, 220 are examples of the D2D discovery signal 116 of FIG. 1. The D2D subframes, 200, 220 include DMRS symbols 204 and D2D message symbols 206. Each subframe 200, 220 also includes a gap 208. The D2D subframes 200, 220 include a cell identifier 202 where the cell identifier 202 is any information that allows other UE devices to identify the serving cell of the UE device transmitting the D2D subframe 200, 220. In systems operating in accordance with a 3GPP LTE specification, the Cell ID is preferably a Cell Global Identity (CGI) for 3G and eCGI for 4G systems. The CGI is useful since inter-PLMN discovery is supported in D2D and the PLMN information is included in the CGI (and eCGI). In some circumstances, the Cell ID may be the Physical Cell ID (PCI). The cell identifier may be transmitted as a message payload or may be embedded in a reference signal (DMRS).

FIG. 2A is a block diagram of a D2D subframe 200 where the cell identifier (e.g., Cell ID) 202 is contained in the D2D message symbols 206. At least some of the D2D message symbols 210 are used to convey the Cell ID. FIG. 2A, shows some D2D message symbols 212 that are not used for the cell identifier 202. In some situations, all the D2D message symbols can be used for the cell ID 202. As mentioned above, the D2D subframe 200 may be a D2D discovery subframe in some situations. Accordingly, the cell identifier 202 may be transmitted in the D2D discovery message of a D2D discovery signal.

FIG. 2B is a block diagram of the D2D subframe 220 where the cell identifier 202 is embedded in the reference signal. The reference signal (DMRS) of the D2D subframe 220 is manipulated to reflect the cell identifier 202. The reference signal, for example, may be scrambled with a code that is correlated to, or otherwise reflective of, the Cell ID such that another UE device can retrieve the Cell ID when decoding the D2D discovery subframe 220. Therefore, the scrambling sequence for scrambling the DMRS of the D2D subframe is a function of the cell identifier 202. The scrambling sequence may also be a function of the D2D group ID and/or the UE device ID. The D2D message symbols 206 can be used for purposes other than the cell identifier 202. The D2D subframe 220 may be a D2D discovery subframe in some situations. In such situations, the scrambling sequence for scrambling the RS of the D2D discovery signal is a function of the cell identifier.

Figure 3:
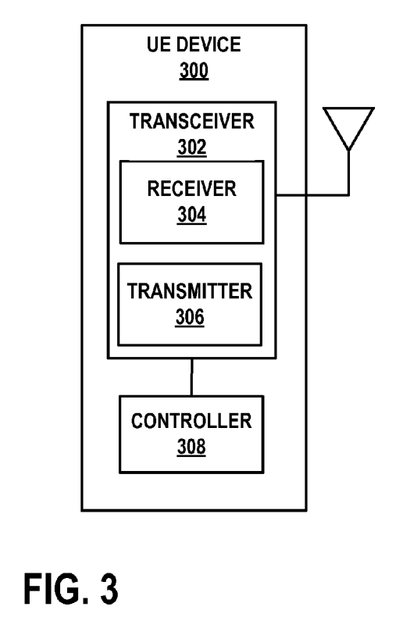
FIG. 3 is a block diagram of a wireless user equipment (UE) device suitable for use as the UE devices.

FIG. 3 is a block diagram of a wireless user equipment (UE) device 500 suitable for use as the UE devices 106, 108. Each of the UE devices includes a transceiver 302 a controller 304, as well as other components and circuitry (not shown) such as memory and a user interface, for example. The transceiver 302 includes a transmitter 304 and a receiver 306. The transceiver 302 transmits uplink wireless signals to base stations and receives downlink wireless signals from the base stations. The transceiver can also be configured to transmit and receive D2D signals using allocated uplink communication resources. The controller 304 controls components of the mobile wireless communication device to manage the functions of the device described herein as well as to facilitate the overall functionality of the device 300. The controller 304 is connected to the transceiver 302 and other components such as memory.

Figure 4:
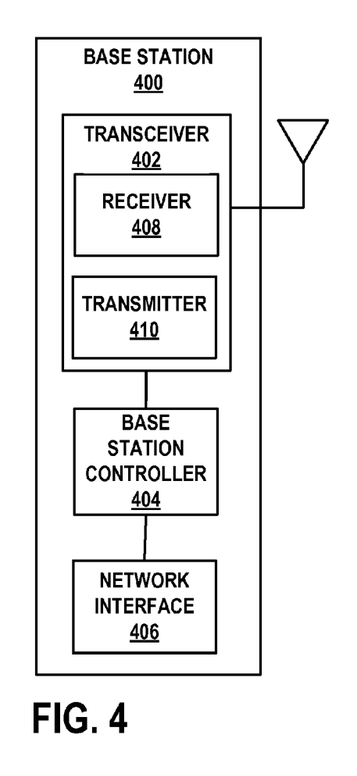
FIG. 4 is a block diagram of a base station suitable for use as the base stations.

FIG. 4 is a block diagram of a base station 400 suitable for use as the base stations 102, 104. Each of the base stations includes a transceiver 402, a base station controller 404, and a network interface 406. In some situations, the components may not be collocated. For example, the base station controller 404 may be separated from the transceiver 402. The transceiver 402 includes a transmitter 408 and a receiver 410. The transceiver 402 receives uplink wireless signals from UE devices and transmits downlink wireless signals to UE devices. The base station controller 404 controls components of the base station 400 to manage the functions of the base station described herein as well as to facilitate the overall functionality of the base station 400. The base station 400 communicates with the network and other base stations through the network interface 406. For the examples, the network interface 406 is configured to communicate with other base stations using X2 signaling over the backhaul 114.

Figure 5:
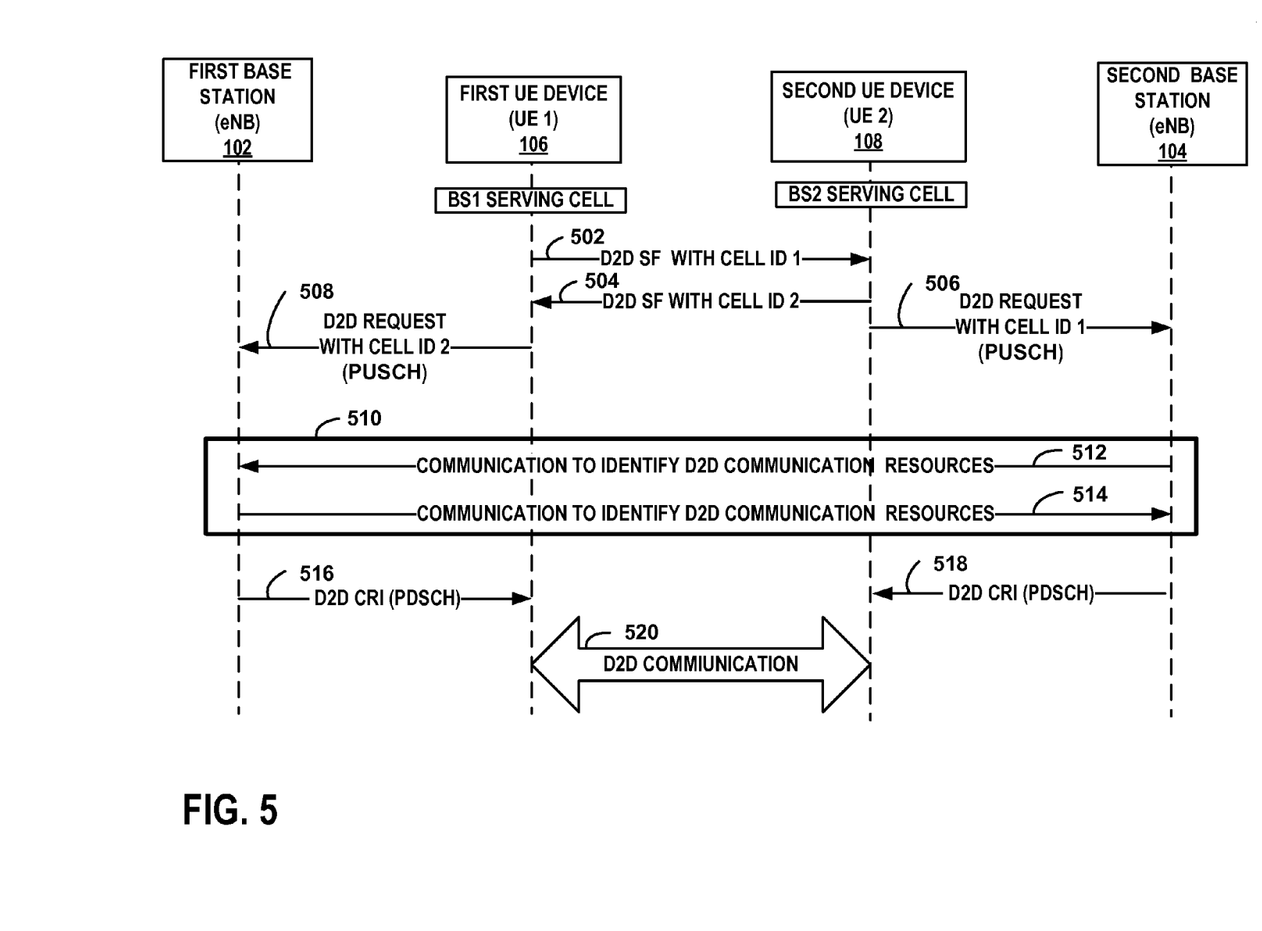
FIG. 5 is a messaging diagram of an example of establishing inter-cell D2D communication.

FIG. 5 is a messaging diagram of an example of establishing inter-cell D2D communication. The first UE device (UE1) 106 is within the first cell 110 served (provided) by the first base station 102 and the second UE device (UE2) 108 is within the second cell 112 served (provided) by the second base station 104. Accordingly, the first base station 102 is the serving station of the first UE device 106 and the second base station 104 is the serving station of the second UE device 108.

At transmission 502, the first UE device 106 transmits a D2D subframe 116 where the D2D subframe 116 identifies the serving cell of the first UE device 106. For the example, the D2D subframe 116 is transmitted within the Physical Uplink Shared Channel (PUSCH) allocated for D2D transmissions. The cell ID (Cell ID 1) of the first cell is transmitted within the D2D message or is reflected in the reference signal.

At transmission 504, the second UE device 108 transmits a D2D subframe where the D2D subframe identifies the serving cell of the second UE device 108. For the example, the D2D subframe is transmitted within the PUSCH allocated for D2D transmissions. The cell ID (Cell ID 2) of the second cell is transmitted within the D2D message or is reflected in the reference signal.

At transmission 506, the second UE device transmits a D2D request with the Cell ID 1 to the second base station 104. The message can be an RRC message such as ProSeUEInformation message. A Physical Uplink Shared Channel (PUSCH) can be used. The D2D request at least indicates a request for D2D resources for D2D communication with the first UE device 106 and identifies the serving cell of the first UE device 106. For the example, the D2D request includes the cell ID (Cell ID 1) of the serving cell 110 of the first UE device. Other information may also be included in the D2D request.

At transmission 508, the first UE device transmits a D2D request with the Cell ID 2 to the first base station 102. The transmission may be an RRC message such as ProSeUEInformation message. A suitable channel for sending the message is the PUSCH. The D2D request at least indicates a request for D2D resources for D2D communication with the second UE device 108 and identifies the serving cell of the second UE device 106. For the example, the D2D request includes the cell ID (Cell ID 1) of the serving cell 112 of the second UE device 108. Other information may also be included in the D2D request.

At event 510, the base stations coordinate to identify the D2D communication resources can be allocated to the D2D UE devices for D2D communication. Therefore, at transmissions 512 and 514, the first base station communicates with the second base station to identify the D2D communication resources that will be allocated for D2D communication between the first UE device and the second UE device. The coordination may take several transmissions between the base stations.

At transmission 516, the first base station sends D2D communication resource information (CRI) to the first UE device. The D2D CRI can be broadcast or provided via dedicated signaling. For example, the D2D CRI can be sent using the RRCConnectionReconfiguration message and including the proseCommConfig Information Element in the message. A SIB18 or SIB19 message can also be used. A suitable channel for the CRI is the PDSCH.

At transmission 518, the second base station sends D2D communication resource information (CRI) to the second UE device.

At event 520, the first UE device and the second UE device communicate over a D2D communication link using the assigned D2D resources.

The messaging discussed with reference to FIG. 5 provides an example of utilizing cell identification information that is received in a D2D subframe (such a D2D discovery subframe) transmitted from a UE device within a different cell. The cell identification information may be used in other ways in some situations. For example, instead of sending a request for D2D resources for D2D communication at transmission 506 and transmission 508, one or both of the UE devices can send request for resources for D2D discovery signal transmission to their serving base stations where the request includes the Cell ID of the serving cell of the other UE device. The base stations 102, 104 can then coordinate to establish appropriate D2D discovery signal resources. In another situation, the UE devices 106, 108 may report the cell ID without making a request for resources. Such a scenario allows the base stations to coordinate and reserve adequate D2D resources for future D2D transmissions although no D2D resources requests were made at the time the cell ID was reported. Therefore, such a scenario may be useful in reducing delays for assigning D2D resources due to the time it takes to coordinate between the base stations. The UE devices may use a ProSeUEInformation message to request D2D discovery signal resources and/or to report the cell ID.

In some situations, a D2D UE device may transition from one cell to another. The D2D UE transitioning to a new cell cannot continue to use the same D2D resources since those resources may not be authorized for use by the D2D UE device in the new cell. As a result, a procedure is executed to transition the D2D UE device to the new cell and continue D2D communication in the inter-cell D2D arrangement.

Figure 6A:
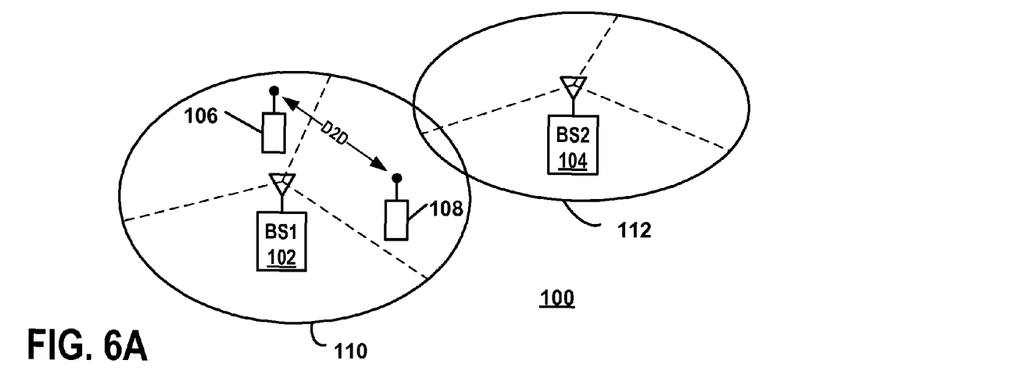
FIG. 6A, is an illustration of the communication system when the first UE device and the second UE device are in the first cell.
Figure 6B:
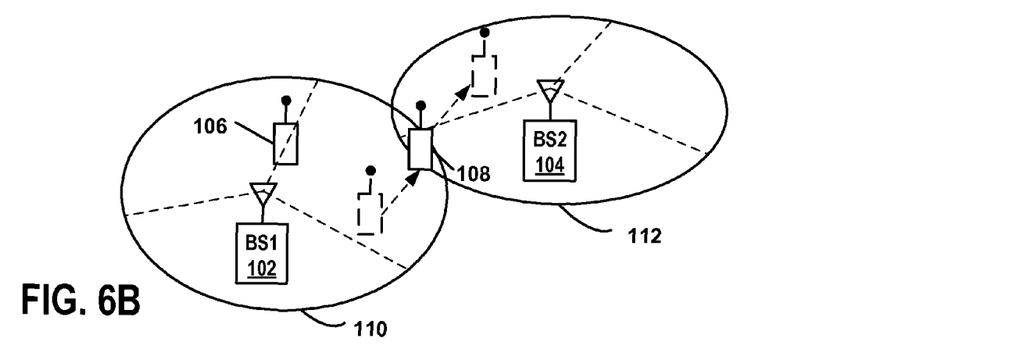
FIG. 6B is an illustration of the communication system during the handover of the second D2D UE device to the second cell while the second UE device is moving from the first cell to the second cell.
Figure 6C:
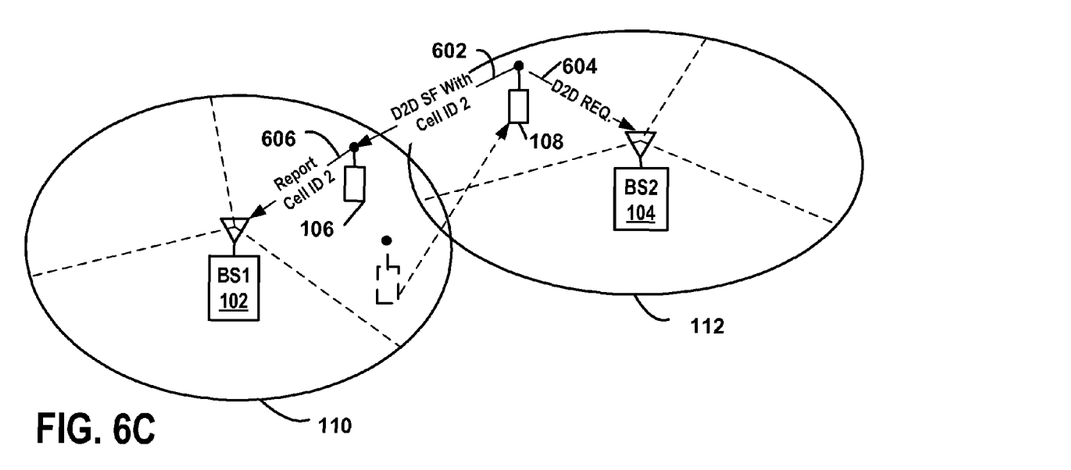
FIG. 6C, is an illustration of the communication system when handover is complete and the first UE device is in the first cell and the second UE device is in the second cell.

FIG. 6A, FIG. 6B and FIG. 6C are illustrations of the communication system 100 as the second D2D UE device 108 moves from the first cell 110 to the second cell 112. In FIG. 6A, the first D2D UE device 106 and the second UE device 108 communicate using D2D while both UE devices 106, 108 are within the first cell 110. In FIG. 6B, the second UE device 108 is moving from the first cell 110 to the second cell 112 and is engaged in a handover from the first cell 110 to the second cell 112. During this cell transition and handover, the UE devices cease D2D communication. When the handover is completed, the second UE device 108 transmits a D2D subframe such as D2D discovery signal identifying its new serving cell.

In FIG. 6C, the handover is complete and the second UE device transmits the D2D subframe 602 with the second cell identifier (Cell ID 2). As discussed above, the Cell ID may be transmitted within the D2D message or may be embedded in the reference signal. The D2D subframe may be a D2D discovery subframe. The second UE device 108 also sends a D2D request 604 to the second base station 104.

The first UE device 106 reports the new serving cell (cell 2) of the second UE device 108 to the serving cell (cell 1). For the example, the first UE device 106 transmits a D2D Cell ID update message 606 to the first base station 102. The D2D Cell ID update message 606 includes the Cell ID of the new cell (second cell) serving the second UE device and the UE ID of the second UE device 108. For inter-frequency situations, the D2D Cell ID update message 606 also includes the channel frequency number. For example, the D2D Cell ID update message 606 includes the channel frequency number identifying serving frequency of the second cell. An example of a suitable structure and transmission of the D2D Cell ID update message 606 includes using structure in accordance with a 3GPP LTE Rel-08 message structure and transmitting the message over the PUSCH/PUCCH. For example, 3GPP LTE standards specify a ProseUEInformation message that can be sent to its serving cell if its serving cell broadcasts SIB19. The broadcast of SIB19 is an indication to the UE that the serving cell supports D2D discovery. Similarly, if the serving cell broadcasts SIB18, it is an indication to the UE that the serving cell supports D2D communication. Currently, the ProseUEInformation message is used by the UE devices to indicate to the base station the UE device's interest in D2D discovery or D2D communication and to request corresponding D2D resources. In one implementation of the D2D Cell ID update message 606, the ProSeUEInformation message is modified to include the Cell ID, the UE ID, and the channel frequency number, where needed.

After receiving the D2D request 604 and the D2D Cell ID update message 606, the base stations coordinate to identify the common D2D resources. Although the coordination between base stations is critical for the intra-frequency scenario due to potential interference, it is also necessary in the inter-frequency scenario. Even if the BS1 102 and BS2 104 operate on different frequencies for D2D, typically a base station (eNB) operates on more than one frequency. For example, BS1 102 may operate on frequencies F1, F2 and F3, but only F1 is used for D2D, while BS2 104 may operate on frequencies F2, F3 and F4, but only F2 is used for D2D. At first glance, it may be assumed that since F1 and F2 (the two D2D frequencies for BS1 and BS2, respectively) are operating on different frequencies, no resource coordination is needed. However, BS1 102 also uses F2 for cellular communication, so the D2D resources used by BS2 104 under F2 could potentially interfere with the cellular resources used by BS1 102. The base stations broadcast the D2D communication resource information within their respective cells and the D2D UE devices resume D2D communication using those D2D resources.

Figure 7:
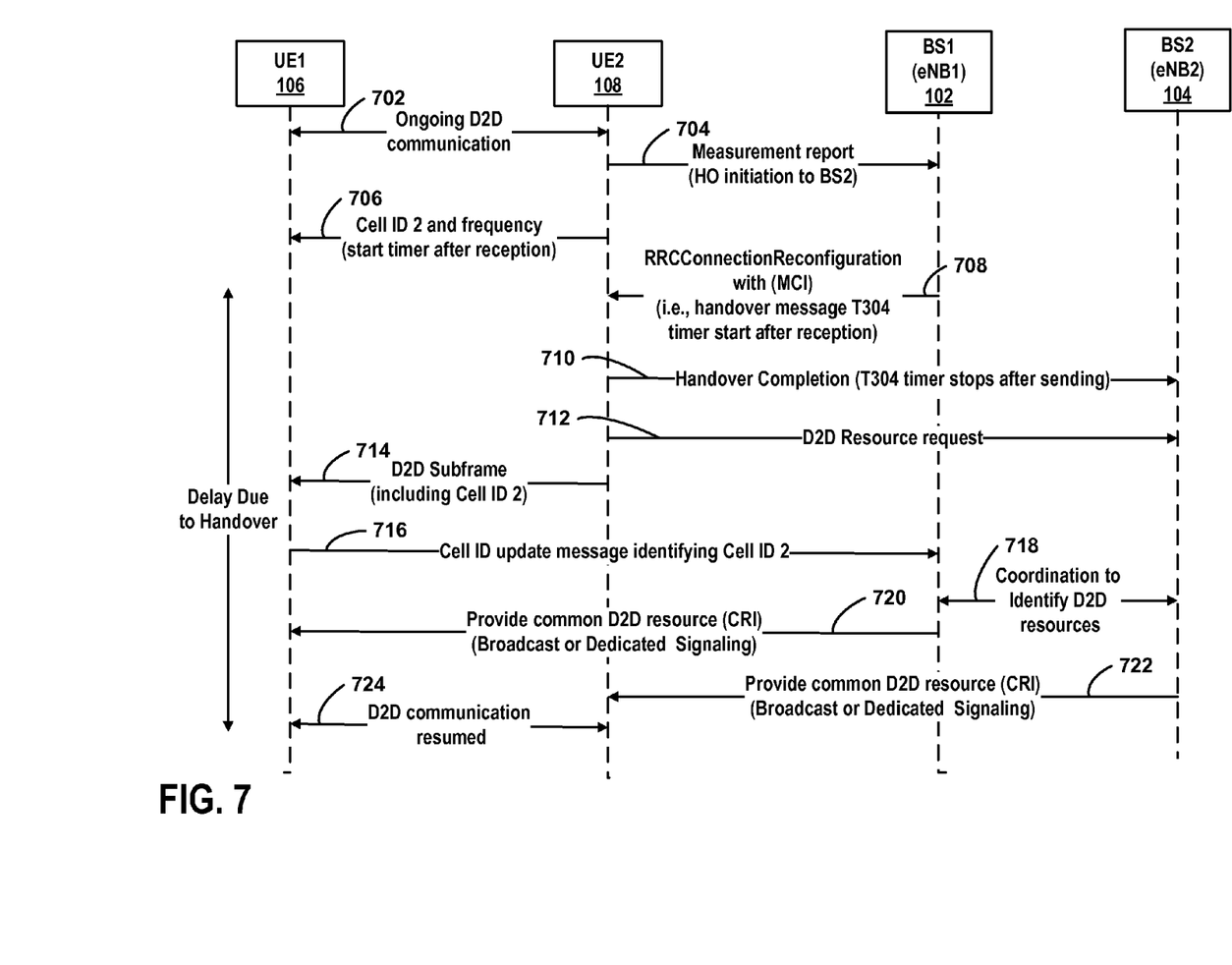
FIG. 7 is a message diagram where the second UE device is communicating with the first UE device and moves from the first cell to the second cell.

FIG. 7 is a message diagram where the second UE device 108 is communicating with the first UE device 106 and moves from the first cell 110 to the second cell 112.

At event 702, the first UE device 106 and the second UE device are communicating over a D2D link. Both devices are in the first cell 110 and being served by the first base station 102.

At transmission 704, a measurement report is transmitted from the second UE device 108 to the first base station 102. For the example, the first UE device is requested by its serving cell (first base station) to perform measurement of a target cell belonging to another frequency. When the configured Event Trigger (e.g., Event A5 (PCell becomes worse than threshold1 and neighbor becomes better than threshold2)) the measurement report is sent to the serving cell. The measurement report may be considered to be a handover trigger.

After the second UE device sends the measurement report 704 to the first base station 102, the first UE device will need to know the target cell (and target cell's frequency) in order for the first UE to be able to monitor discovery pool belonging to the target cell. There are multiple ways that for the first UE to know where to monitor this discovery resource pool of the target cell. In one implementation, a transmission 706 is transmitted by the second UE device 108 to inform the first UE device of the new cell ID and frequency of the second cell (target cell). In some cases the second UE device may alternatively send transmission 706 just before the measurement report 704 is sent to the first base station 102. For example, if a measurement event is triggered (e.g., Event A5), the second UE device may send transmission 706 before sending the measurement report 704 to the first base station 102. In this alternative, the handover trigger is based on the triggering of the measurement event rather than the sending of the measurement report 704. Therefore, before the first base station sends the RRCConnectionReconfiguration message with Mobility Information (handover message) to the second UE device, the second UE device informs the first UE device of the cell ID and frequency of the target cell so that UE1 may begin to monitor D2D on the target frequency. The first UE device also directly monitors the System Information (SIB18 or SIB19) to determine the specific D2D resources assigned by the target cell since this information is not provided by its serving cell. Also, a timer is started after the first UE device receives the cell ID and frequency information from the second UE device. If the timer expires and first UE device does not receive a discovery signal from second UE device (transmission 714), then the first UE device determines that the second UE device's handover was either not initiated or there was a handover failure. Transmission 706 is performed in inter-frequency situations where the frequency of the second cell is different from the frequency of the first cell. In intra-frequency situations where the frequencies are the same, transmission 706 is omitted.

In another implementation, transmission 706, consist only of a 1-bit handover indicator to inform the first UE device that the second UE device is about to be handovered to another cell, but no explicit cell ID or frequency is indicated in message 706. The reference signal (RS) in the D2D subframe (such as a discovery signal subframe) is scrambled with the cell ID of its serving cell. As a result, therefore, the information about the serving cell is implicitly provided in the D2D subframe (discovery signal). Once the first UE device receives the 1-bit handover indicator in transmission 706, it will trigger the first UE device to monitor discovery resource pools for all the neighbor discovery frequencies. Upon successful handover to BS2, the second UE device sends a D2D subframe (discovery signal) with the Cell ID implicitly provided in the D2D subframe such as the discovery signal (i.e. scrambled in the RS of the discovery signal). The reception of 714 with the implicit Cell ID will be an indication to the first UE device that the handover is successful and that the timer can be stopped.

In the case of handover failure, the second UE device will attempt to re-establish on the first cell, and if the re-establishment to the first cell is successful D2D communication may resume between the first UE device and the second UE device within the first cell. However, if re-establishment fails, the second D2D UE may no longer be served by any cell; in this case the first D2D UE should not need to monitor the discovery resource provided by the target cell in the target frequency. The timer expiry would ensure that the first D2D UE will not need to monitor D2D resources from the target frequency.

In yet another implementation, the transmission 706 is not sent. The cell ID is scrambled within the RS, so that the cell ID information is implicitly provided in the discovery signal. In this implementation, this is assumed that the first UE device is always monitoring all discovery resource pools for all frequencies continuously regardless if the second UE device is undergoing handover or not.

At transmission 708, an RRCConnectionReconfiguration message with Mobility Information is transmitted from the first base station to the second UE device. The message is consistent with conventional handover procedures and initiates the handover from the serving cell. T304 is a timer that is started when the second UE device receives the RRCConnectionReconfiguration message. This timer is used in case of handover failure and is not related to D2D operation.

At transmission 710, a handover completion message is sent form the second UE device to the second base station. The T304 timer is stopped after the message is sent.

At transmission 712, the second UE device sends an RRC message (e.g., ProSeUEInformation message) to request D2D transmit resources from the second base station (target cell).

At transmission 714, the second UE device transmits a D2D subframe such as D2D discovery signal to the first UE device. The D2D subframe (D2D discovery signal) includes the Cell ID of the second cell. The first UE device is monitoring the frequency of this cell either because it is an intra-frequency situation or it is an inter-frequency situation and the first UE device was informed of the target frequency at transmission 706. For inter-frequency scenarios, the reception of this D2D message is an indication that the handover is completed successfully for the second UE device and the first UE device should continue to monitor discovery resources belonging to the target cell in the target frequency. The timer started in transmission 706 is stopped. As explained above, if the timer expires (not stopped), the first UE device determines that the handover for the second UE device was not successful and the first UE device stops monitoring the target cell/frequency. In the case of handover failure, the second UE device will attempt to re-establish on the first cell, and if the re-establishment to the first cell is successful D2D communication may resume between the first UE device and the second UE device within the first cell. However, if re-establishment fails, the second D2D UE may no longer be served by any cell; in this case the first D2D UE should not need to monitor the discovery resource provided by the target cell in the target frequency. The timer expiry would ensure that the first D2D UE will not need to monitor D2D resources from the target frequency.

The D2D subframe is transmitted as soon as possible after the handover is complete. Therefore, where the D2D subframe is a discovery subframe, the D2D discovery signal is transmitted in response to completion of the handover and is sent independent of a status of a discovery signal buffer at the D2D UE device. In accordance with the 3GPP specifications, the UE devices can only transmit discovery signals when configured (assigned) a communication resource for transmission. Typically, a semi-persistent transmission resource is scheduled to the UE if the UE is interested in sending a D2D discovery signal. The length of the semi-persistence resource may be dependent of the buffer size of the intended D2D discovery signal. However, if the UE device is not interested in transmitting any discovery signal no resources may be requested by the UE device. Therefore, there may be a period of time when the UE device does not send any D2D discovery signals. Accordingly, after the handover is initiated 704, the second UE device transmits D2D discovery signals in accordance with the schedule provided by the first base station. However, if the second UE device does not have D2D discovery resource, it sends a request for such resources from its source base station (first base station) before sending the measurement report 704. Alternatively, the second UE device may use the common discovery resource allocated over the SIB19 or (SIB18 in case of D2D communication) by the first base station for D2D discovery transmission. The D2D transmissions are suspended during the handover including suspension of D2D discovery signal transmission. When the handover is completed, the second UE device must be configured by the second base station with the resource for transmitting the D2D discovery signal or the second UE device may be configured to use common discovery resource allocated over SIB19 by the second base station (target base station). The second UE device should transmit a discovery subframe to second UE device even if the second UE device is not interested in transmitting D2D discovery signal (e.g., D2D data buffer is empty). This discovery subframe 714 must be received by the first UE device in order for the first UE device to stop the timer.

At transmission 716, a cell ID update message is sent from the first UE device to the first base station. The message informs the serving cell of the first UE device that the second UE device has the second cell (Cell ID 2) as a serving cell.

At event 718, the base stations coordinate to determine common resource pools based on priority (if needed). Accordingly, the base stations identify the D2D resources that can be used by the UE devices 106, 108 for D2D communication.

At transmission 720, the first base station provides the updated resource pool information (the communication resources information (CRI)) to the first UE device by dedicated signaling or by broadcasting the information in SIB19.

At transmission 722, the second base station provides the updated resource pool information (the communication resources information (CRI)) to the second UE device by dedicated signaling or by broadcasting the information in SIB19.

At event 724, the UE devices 106, 108 resume D2D communication using the resources for the pool of resources provided by the base stations.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method performed at a device-to-device (D2D) user equipment (UE) device, the method comprising:
   communicating with another D2D UE device using D2D communication while the D2D UE device and the another D2D UE device are located within a first cell provided by a first base station;
   transmitting a D2D subframe to the another D2D UE device after a handover from the first cell to a second cell is complete, the D2D subframe conveying a cell identifier identifying the second cell;
   transmitting a D2D request to a second base station providing the second cell;
   receiving, from the second base station, communication resource information identifying D2D communication resources; and
   continuing D2D communication with the another D2D UE device using the D2D communication resources.

2. The method of claim 1, further comprising:
   after the handover is initiated, transmitting a message with the cell identifier and a frequency of the second cell.

3. The method of claim 2, wherein reception at the another D2D UE device of the message with the cell identifier and frequency triggers a timer at the another D2D UE device, wherein if the timer is stopped before expiration, the another D2D UE device monitors for discovery signal in accordance with the frequency indicated in the message.

4. The method of claim 1 further comprising:
   suspending D2D communication after the handover is initiated.

5. The method of claim 1, wherein transmitting the D2D subframe comprises transmitting a D2D discovery subframe to the another D2D UE device in response to completion of the handover independent of a status of a discovery signal buffer at the D2D UE device.

6. The method of claim 1, wherein the handover is triggered by a measurement report sent by the D2D UE device.

7. The method of claim 1, wherein the D2D subframe includes a D2D message comprising the cell identifier.

8. The method of claim 1, wherein a scrambling sequence for scrambling a reference signal of the D2D subframe is a function of the cell identifier.

9. A method performed at a first device-to-device (D2D) user equipment (UE) device, the method comprising:
   communicating with a second D2D UE device using D2D communication while the first D2D UE device and the second D2D UE device are located within a first cell provided by a first base station;
   receiving a D2D subframe from the second D2D UE device after a handover of the second D2D UE device to a second cell is complete, the D2D subframe conveying a cell identifier identifying the second cell;
   transmitting a cell ID update message including the cell identifier to the first base station;
   receiving, from the first base station, communication resource information identifying D2D communication resources; and
   continuing D2D communication with the second D2D UE device using the D2D communication resources.

10. The method of claim 9, further comprising:
    after the handover is initiated, receiving a message with the cell identifier and a frequency of the second cell; and
    monitoring a channel for the discovery signal in accordance with the frequency.

11. The method of claim 10, further comprising:
    initiating a timer in response to receiving the message with the cell identifier and frequency at the first D2D UE device; and
    monitoring, at the first D2D UE device, the channel for the discovery signal in accordance with the frequency only if the timer is stopped before expiration of the timer.

12. The method of claim 9 further comprising:
    suspending D2D communication after the handover is initiated.

13. The method of claim 9, wherein the handover is triggered by a measurement report sent by the second D2D UE device.

14. The method of claim 9, wherein the D2D subframe includes a D2D message comprising the cell identifier.

15. The method of claim 9, wherein a scrambling sequence for scrambling a reference signal of the D2D subframe is a function of the cell identifier.

16. A method comprising:
providing a first cell for communication from a first base station;
providing a second cell for communication from a second base station, a first user equipment (UE) device and a second UE device communicating over a device-to-device (D2D) communication link within the first cell;
receiving, at the first base station, a measurement report from the second UE device to trigger a handover of the second UE device from the first base station to the second base station;
after the handover is complete, receiving, at the second base station from the second UE device, a request for D2D resources;
receiving, at the first base station from the first UE device, a cell identifier identifying the second cell as the serving cell of the second UE device;
coordinating between the first base station and the second base station to identify common D2D resources for D2D communication between the first UE device and the second UE device; and
transmitting communication resource information from the first base station to the first UE device and from the second base station to the second UE device, the communication resource information identifying the common D2D resources.

17. The method of claim 16, wherein the cell identifier is received at the first UE device from the second UE device in a D2D subframe.

18. The method of claim 17, wherein the cell identifier is received at the first UE device from the second UE device in a D2D discovery signal.

19. The method of claim 16, wherein the base stations and UE devices operate in accordance with at least one release of The Third-Generation Partnership Project Long-Term Evolution (3GPP LTE) communication specification.

20. A device-to-device (D2D) user equipment (UE) device comprising:
a transceiver configured to exchange D2D signals from another D2D UE device using D2D communication while the D2D UE device and the another D2D UE device are located within a first cell provided by a first base station,
the transceiver comprising a transmitter and a receiver, the transmitter configured to:
transmit a D2D subframe to the another D2D UE device after a handover of the D2D UE device from the first cell to a second cell is complete, the D2D subframe conveying a cell identifier identifying the second cell and to transmit a D2D request to a second base station providing the second cell;
the receiver configured to receive, from the second base station, communication resource information identifying D2D communication resources, the transceiver configured to resume D2D communication with the another D2D UE device using the D2D communication resources.

21. The D2D UE device of claim 20, wherein the D2D subframe includes a D2D message comprising the cell identifier.

22. The D2D UE device of claim 20, wherein a scrambling sequence for scrambling a reference signal of the D2D subframe is a function of the cell identifier.

* * * * *